Aug. 13, 1946.  A. L. THURSTON  2,405,803
CALCULATOR
Filed Aug. 17, 1945

INVENTOR.
ARTHUR L. THURSTON
BY
ATTORNEY

Patented Aug. 13, 1946

2,405,803

UNITED STATES PATENT OFFICE 2,405,803

CALCULATOR

Arthur L. Thurston, Wantagh, N. Y., assignor to Cox and Stevens Aircraft Corporation, a corporation Application August 17, 1945, Serial No. 611,213

6 Claims. (Cl. 235—61.02)

1

My invention relates to calculators, and more particularly to calculators of the type described and claimed in U. S. Patents No. 2,296,692 and 2,334,135.

Figure 1:
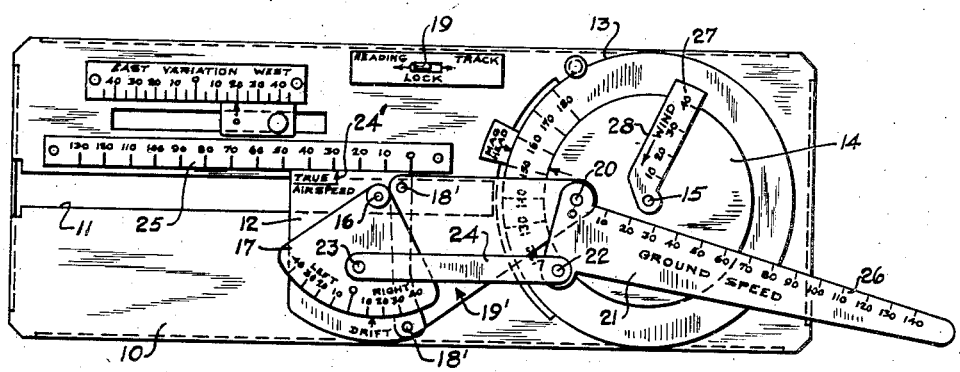

In the vector diagram set up in Patent No. 2,296,692, the true air speed is the distance between the centers or axes of rotation 30 and 31 as indicated in Figure 1 of said patent. Said axes, by reason of the mechanical construction of the patented calculators, cannot be brought into coincidence. In fact, the axis 30 of Patent No. 2,296,692 cannot be shifted or moved, under any circumstances, either across or beyond the periphery of the disc or member 26, which is rotatable about the axis 31. The same is true of the corresponding axes of Patent No. 2,334,135. Accordingly, the minimum true air speed which may be set up with the patented calculators is limited by the minimum distance that the one axis can be set with respect to the other. No matter to what scale the speed scales are laid out, unless the maximum true air speed is higher than the maximum wind speed, the patented calculators lack utility. This latter statement, however, where the patented calculators are used in solving problems encountered in airplane navigation is not necessarily a detriment since the cruising speed of the conventional airplane, under practically all operating conditions, is considerably above the highest wind speeds ordinarily encountered.

With the above in mind one object of the present invention is to so modify the construction of the patented calculators above referred to as to render either or both useful in solving navigational problems encountered in the operation of certain slower speed types of aircraft such as dirigibles or helicopters where the air speeds attained frequently approach zero in winds of considerably higher velocity.

A further object of the invention is to provide a calculator which is readily usable in solving certain problems encountered in maneuvering surface ships, for example, where the solution is obtainable by setting up triangles of speeds and directions, or triangles of distances and directions, or both—yet retaining in the calculator all of the inherent advantages which characterize the previously mentioned patented types.

Other objects and advantages of the invention will be hereinafter set forth.

Figure 2:
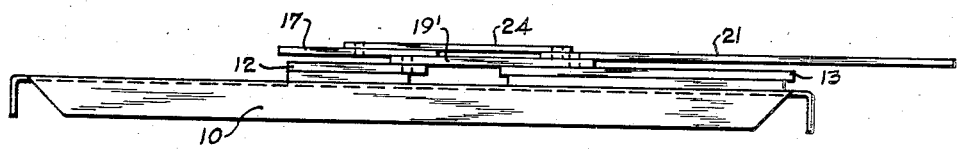
Figure 3:
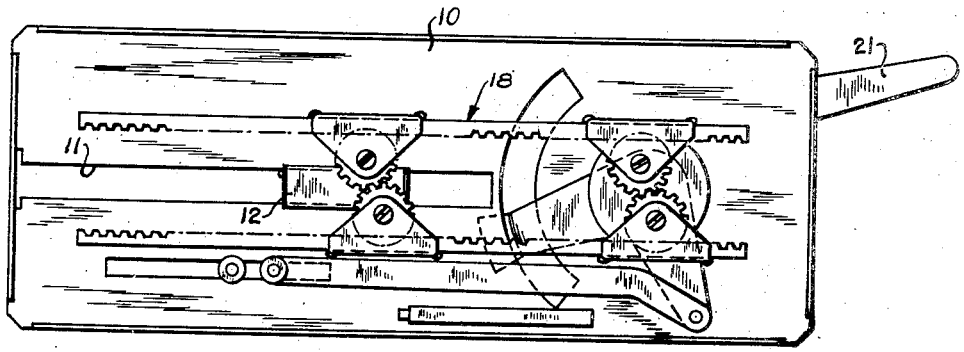

In the drawing, wherein like reference characters denote like or corresponding parts:

Figure 1 is a top plan view of the calculator;
Figure 2 is an edge view thereof; and
Figure 3 is an inverted plan view.

As previously stated, the calculator as a whole is generally similar to that disclosed in Patents Nos. 2,296,692 and 2,334,135, the latter being a continuing development of the former. In fact,

2 in many respects, the calculator herein disclosed and the calculator shown in Patent No. 2,334,135 are identical. Note particularly Figure 3 hereof which is a duplicate of Figure 2 of the latter.

The frame or base member of the calculator is designated 10. It has formed therein a slot 11 within which a slide or carrier member 12 is fitted for sliding movement. It is also provided with a compass rose disc 13 and a true track index disc 14, both of which are rotatable about a fixed common axis of rotation 15, and both of which are mounted to the frame 10 beyond one end of the slot 11. The slide or carrier member 12 has pivoted thereto as at 16 a rotatable member 17, preferably in the form of a segment. Said member 17, and the rotatable true track disc or member 14, are interconnected by a mechanism designated in its entirety as 18 which is identical with the corresponding mechanism disclosed in Figure 2 of Patent No. 2,334,135. In the operation of the device said mechanism 18 is adapted to impart to the member 14 rotation in the same magnitude and sense as that imparted to the rotatable segment or member 17. A heading or track lock 19 selectively holds the compass rose disc 13 stationary to the base 10, or permits (the compass rose) to rotate as a unit with the member 14. With the exception of the rotatable segment or member 17 (herein consisting of only that portion on which is inscribed left and right drift scales), the parts above referred to are the same in construction and function as are the corresponding parts disclosed in the calculators of said patents.

Attached rigidly to the slide or carrier member 12, by means of spaced eyelets 18', is a flat, preferably transparent, extension piece 19' which, in certain positions of adjustment of the carrier, is adapted to overlie the periphery of the rotatable disc or member 14. This extension piece 19', at its outer end, has pivoted thereto as at 20 an arm or rotatable member 21, said arm being freely movable across the face of the disc or member 14 about an axis of rotation defined by said pivot. The pivot axis 20, it will be noted, is exactly in line with the centers or axes of rotation 15 and 16 above referred to, or in other words, all of said axes 15, 16 and 20 lie in a common plane.

Connecting the segment 17 and the arm 21, and pivoted at its opposite ends respectively thereto, as by eyelets 22 and 23, is a transparent link 24. The link pivots 22 and 23, it will be noted, are the same distance apart as are the axes of rotation 16 and 20, and the same is true of the axes 20 and 23 as compared to the axes 16 and 22. By so locating the axes 16, 20, 22 and 23, it is inevitable that any rotation or angular movement of the arm 21 will impart to the segment 17 like angular movement or rotation in the same magnitude and sense as that obtained by the mechanism 18 interconnecting the segment 17 and the rotatable disc or member 14. In other words, the whole assembly consisting of the carrier 12, the extension 19', the members 17 and 21, and the link 24, is such that the assembly is free to move along the slot 11 toward and away from the axis of rotation 15 of the disc 14 without changing the angular displacement of the segment 17, the arm 21 and the disc 14—an attribute essential to the proper functioning of the patented calculators as well as of the calculator made the subject hereof. Also—and this is the crux of the present invention—by means of said assembly, it is possible and practical not only to move said assembly toward and away from the axis of rotation 15 of the disc 14, but to move same to such an extent as to admit of said axis 20 being brought to any position of adjustment intermediate the disc periphery up to and including a point where the axes 20 and 15 coincide—a feature of construction not present in the patented devices.

In the present device the true air speed, wind and ground speed scales are as described in the patented devices—the true air speed vector being the distance between the centers of rotation 20 and 15 so that when the center 20 is over the center 15 the true air speed index, designated at 24', will be at the zero of the true air speed scale 25. Note also that the zero of the ground speed scale 26 on the arm 21 is at the center 20 and that the zero of the wind velocity scale 27 on the arm 28 is at the center 15. Thus, vectors of from zero up to any value provided by the respective scales may be set up for wind, true air speed and ground speed.

In conclusion, it may be further pointed out that in certain problems both in aerial and surface navigation it is necessary to set up both triangles of distances and directions and triangles of speed vectors. In so doing, it is obvious that the speed scales may be used as distance scales for such purpose.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a calculator, a first rotatable member having a fixed axis of rotation, a second rotatable member having an axis of rotation parallel with the axis of rotation of said first rotatable member, the axis of rotation of said second rotatable member being movable across and beyond the periphery of said first rotatable member, and means interconnecting said two rotatable members adapted to impart to one thereof in response to rotational movement of the other like angular movement of like magnitude and sense, regardless of the spatial relationship of the member axes.

2. In a calculator, a first rotatable member having a fixed axis of rotation, a second rotatable member having an axis of rotation parallel with the axis of rotation of said first rotatable member, the axis of rotation of said second rotatable member being movable into and out of coincidence with the axis of rotation of said first rotatable member, and means interconnecting said two rotatable members adapted to impart to one thereof in response to rotational movement of the other like angular movement of like magnitude and sense, regardless of the spatial relationship of the member axes.

3. In a calculator, a first rotatable member having a fixed axis of rotation, a carrier member movable toward and away from the axis of rotation of said first rotatable member, an extension formed on said carrier, a second rotatable member having an axis of rotation parallel with the axis of rotation of said first rotatable member, said second rotatable member being mounted on said extension and said last mentioned axis of rotation being so located relatively to said extension as to admit of its movement across and beyond the periphery of the first mentioned rotatable member, and means interconnecting said two rotatable members adapted to impart to one thereof in response to rotational movement of the other like angular movement of like magnitude and sense, regardless of the spatial relationship of the member axes.

4. In a calculator, a first rotatable member having a fixed axis of rotation, a carrier member movable toward and away from the axis of rotation of said first rotatable member, an extension formed on said carrier, a second rotatable member having an axis of rotation parallel with the axis of rotation of said first rotatable member, said second rotatable member being mounted on said extension and said last mentioned axis of rotation being so located relatively to said extension as to admit of its movement across and beyond the periphery of the first mentioned rotatable member, a third rotatable member mounted on said carrier, and means interconnecting the three rotatable members adapted to impart to any two thereof in response to rotational movement of the third, like angular movement of like magnitude and sense, regardless of the spatial relationship of the member axes.

5. In a calculator, a first rotatable member having a fixed axis of rotation, a second rotatable member having an axis of rotation movable across and beyond the periphery of said first rotatable member, a third rotatable member spaced from said second rotatable member, said third rotatable member being movable accordingly as said second rotatable member is moved, the axes of rotation of the three rotatable members being parallel and disposed at all times in a common plane, and means interconnecting the three rotatable members adapted to impart to any two thereof in response to rotational movement of the third, like angular movement of like magnitude and sense, regardless of the spatial relationship of the member axes.

6. In a calculator, a first rotatable member having a fixed axis of rotation, a second rotatable member having an axis of rotation movable into and out of coincidence with the axis of rotation of said first rotatable member, a third rotatable member spaced from said second rotatable member, said third rotatable member being movable accordingly as said second rotatable member is moved, the axes of rotation of the three rotatable members being parallel and disposed at all times in a common plane, and means interconnecting the three rotatable members adapted to impart to any two thereof in response to rotational movement of the third, like angular movement of like magnitude and sense, regardless of the spatial relationship of the member axes.

ARTHUR L. THURSTON.